United States Patent [19]

Yamamoto

[11] Patent Number: 4,883,724
[45] Date of Patent: Nov. 28, 1989

[54] CONTROL UNIT OF FUEL CELL GENERATING SYSTEM

[75] Inventor: Osamu Yamamoto, Tiba, Japan

[73] Assignee: Fuji Electric Co., Ltd., Kawasaki, Japan

[21] Appl. No.: 310,534

[22] Filed: Feb. 13, 1989

[30] Foreign Application Priority Data

Feb. 18, 1988 [JP] Japan .................................. 63-36333

[51] Int. Cl.⁴ ............................................. H01M 10/48
[52] U.S. Cl. ........................................ 429/23; 429/92; 429/61
[58] Field of Search ................ 429/22, 23, 21, 90–92, 429/61; 320/48, 49; 324/433, 429

[56] References Cited

U.S. PATENT DOCUMENTS 3,996,579 12/1976 Dahl ................................. 429/92 X
4,329,406 5/1982 Dahl et al. ............................ 429/92
4,424,491 1/1984 Bobbett et al. .................. 429/23 X
4,436,793 3/1984 Adlhart ............................. 429/21 X
4,650,729 3/1987 Nakamura et al. ............... 429/91 X
4,741,978 5/1988 Takabayashi ........................ 429/23

Primary Examiner—Anthony Skapars
Attorney, Agent, or Firm—Brumbaugh, Graves, Donohue & Raymond

[57] ABSTRACT

The disclosed control unit for a hybrid power generating system including a fuel cell and a storage battery backup includes an auxiliary controller for the fuel cell itself, and an output current controller for controlling the output current drawn from the fuel cell, whereby the storage battery can be charged for recovery within the shortest possible time to reach a target remaining charge capacity under charging conditions that do not cause deterioration of performance of the battery. The system is useful as the power supply in applications subject is sudden load fluctuations such as are encountered in a fork lift truck, for example.

9 Claims, 2 Drawing Sheets

CONTROL UNIT OF FUEL CELL GENERATING SYSTEM

The present invention relates to a control unit of a fuel cell generating system employed, for example, for a power supply for an electric car such as a forklift truck.

BACKGROUND OF THE INVENTION

In general, in a fuel cell generating system formed by combining a fuel cell and a fuel reformer, it is difficult to have the output of the fuel cell respond quickly with the variation in load when the load is varied suddenly under operating conditions of traveling or cargo loading since the response speed of the reformer is slow. Such being the case, a fuel cell generating hybrid system, in which a storage battery is connected to the output side of the fuel cell as a backup for the fuel cell, has been used, in which needed electric power not capable of being supplied by the fuel cell is discharged from the storage battery under heavy load operating conditions, and in which the storage battery is charged for recovery with surplus electric power of the fuel cell under light load or no-load operation, as proposed by the present applicant under Japanese Patent Application No. 121147/87.

On the other hand, when the storage battery continues to be charged from the fuel cell under light load or no-load operation for a long time, the storage battery is over-charged. Conversely, when the shortage in electric power of the fuel cell is discharged from the storage battery for a long time under heavy load operation, the storage battery is over-discharged. If such overcharged and overdischarged states are repeated, the life of the storage battery is extremely shortened. A control unit of a fuel cell generating system, in which the charged quantity of the storage battery is monitored, the storage battery is held under a highly charged state so as to cope with a heavy load by controlling the output of the fuel cell in correspondence with the residual capacity of the storage battery, and the stabilization of electric power fed to the load is devised at the same time, has been proposed as a countermeasure by the present applicant under Japanese Patent Application No. 110634/87.

Thereupon, it is required to always maintain the storage battery of the generating system always under a state of high residual capacity so as to cope with a heavy load in case that the load is fluctuated suddenly because of cargo handling or travel motion such as in the above-mentioned case of a forklift truck. To this end, it is required to finish charging the storage battery in shortest possible time within the window of an allowable charging condition so as not to shorten the life of the storage battery.

The above-mentioned proposed control systems utilize a basic control system that controls and varies only the output of the fuel cell in correspondence with the charged quantity of the storage battery. They are insufficient to finely control the output of the fuel cell based on the charging characteristics of the storage battery to finish charging for recovery of the storage battery in the shortest possible time under allowable charging conditions, in such a manner that does not cause deterioration of performance of the storage battery as described above.

With reference to FIG. 3, there is shown charging and discharging characteristics at a regular time factor of the storage battery with a lead storage battery as an object. In regions A and B of said characteristics, the battery reactions of charging and discharging are performed reversibly, whereas the stable reversible reaction is collapsed in the overcharged or over-discharged state shown in region C and an irreversible state is produced. It has been known that, if the storage battery is used repeatedly in this region, the battery characteristics are not only deteriorated, but also the life is shortened sharply. Also, FIG. 4 shows current to voltage characteristics in the charging of a lead storage battery in terms of respective discharged quantities (%), and a characteristic line D in the Figure represents a boundary line of the allowable charging region. That is, safe charging operation is performed with a small charging current below the intersection of characteristic lines of respective charging quantities (%) and the boundary line D of the charging allowable regions, but deterioration of performance of the storage battery progresses rapidly if rapid, which applies a large charging current, is repeated in the broken line region which exceeds the intersection of said characteristic line. In other words, when a storage battery is charged for recovery, the allowable charging current, thus the allowable charging voltage, is different in accordance with the state of residual capacity from the characteristic aspect of the storage battery. In particular, when the light load operating time in the intervals of heavy load operation is utilized, as mentioned above and it is required to charge the storage battery for recovery in a short time without causing deterioration of battery characteristics, fine control of performing charging for recovery under charging conditions closest to the very limit of the allowable region shown in FIG. 4 is required.

It is an object of the present invention to provide a control unit of a fuel cell generating system which makes it possible to perform fine control so as to charge the storage battery for recovery within the shortest possible time to reach the target charged quantity under such charging conditions that do not cause deterioration of performance of the storage battery, and which exhibits excellent effects in a fuel cell generating hybrid system used as a power supply in applications subject to sudden load fluctuations such as are encountered in a fork lift truck, for example.

SUMMARY OF THE INVENTION

In order to achieve the above-mentioned object, the control unit of the present invention comprises output control means for controlling the output of the fuel cell, output current control means for controlling the output current drawn out of the fuel cell, means for detecting the storage battery voltage, means for detecting the charged quantity of the storage battery, and a controller for controlling the output control means and the output current control means of the fuel cell by comparing a set value of an allowable charging voltage corresponding to each charged state and a target value of charged quantity to be always maintained, said set and target values being predetermined based on charging characteristics of the storage battery with the detected values of the voltage and charged quantity of the storage battery obtained from the respective detecting means.

The set value of the allowable charging voltage and the target value of the charged quantity are stored in a memory provided in the controller, in which the target value of the charged quantity to be maintained is set preferably at more than 80%, and the charging control pattern is set corresponding to the residual capacity of the storage battery as shown with a charging allowable boundary line E in FIG. 2 which is determined on the basis of current-voltage characteristics of the storage battery described in connection with FIG. 4. Also, the residual capacity of the storage battery is obtainable by monitoring the charged and discharged quantity of the storage battery through charged quantity detecting means and computing with comparison with the rated capacity.

When electricity is discharged from the storage battery because of heavy load operation at the time of operation of the generating system and the remaining capacity is lowered to less than 80%, the detected value of the charged quantity and the voltage value of the storage battery are compared with respective set values stored in the memory of the controller as previously described, and the output control means and the output current control means are controlled so as to have the output and the output current of the fuel cell increase under such a condition that the charging voltage of the storage battery, i.e., the output voltage fed to the load and the storage battery from the fuel cell, does not exceed the set value of the allowable charging voltage of the storage battery, thus charging for recovery until the storage battery reaches the target charged quantity. Practical control is performed by means of a system that PID control is performed after determining the set value at one point over the remaining capacity at 80% of the storage battery or 2-position control is performed by determining two points over the remaining capacity at 80%.

In such a manner, by controlling the output of the fuel cell while controlling the charging voltage to the set value of the allowable charging voltage in accordance with the remaining capacity of the backup storage battery, it is possible to charge the storage battery for recovery in a short time under such a charging condition that deterioration of performance of the storage battery is not caused when the remaining capacity of the storage battery is lowered to below the target value and, at the same time, to always feed stable electric power to the load corresponding to sharp fluctuations of the load.

DETAILED DESCRIPTION OF THE PREFERRED EMBODIMENTS

Figure 1:
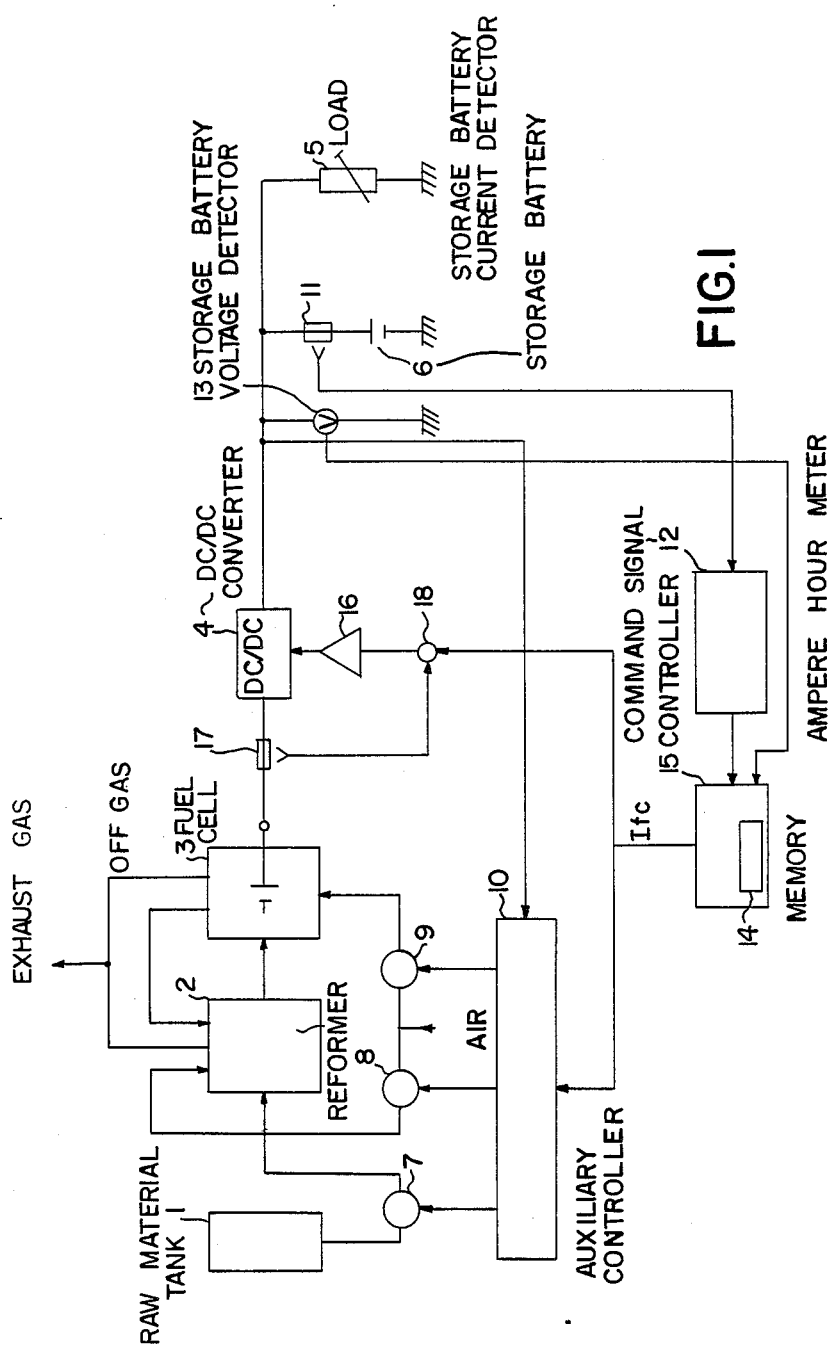
FIG. 1 is a system diagram of a control unit of a fuel cell generating system according to an embodiment of the present invention.

FIG. 1 is a block diagram showing a control unit of a fuel cell generating system according to an embodiment of the present invention. In FIG. 1, reference numeral 1 denotes a raw material tank having reforming raw material such as methanol in store, 2 denotes a reformer, 3 denotes a fuel cell, 4 denotes a DC—DC convertor as an output current control means of the fuel cell 3, 5 denotes a load and 6 denotes a storage battery for backup. Also, 7 denotes a raw material transfer pump feeding reforming material to the reformer 2 from the raw material tank 1, 8 denotes a combustion air blower for supplying combustion air to a burner of the reformer 2, 9 denotes a reaction air blower for supplying reaction air into the fuel cell 3 and 10 denotes an auxiliary controller as output control means which performs output control of the fuel cell by controlling the operation of this auxiliary equipment. The fuel cell generating system is composed of these equipments. Besides, above-mentioned reformer 2 is arranged to obtain reforming reaction heat by burning the off-gas discharged from the fuel cell 3, and the electric power consumed by the above-mentioned auxiliary equipment and the auxiliary controller 10 is fed from the output side of the fuel cell 3.

Figure 2:
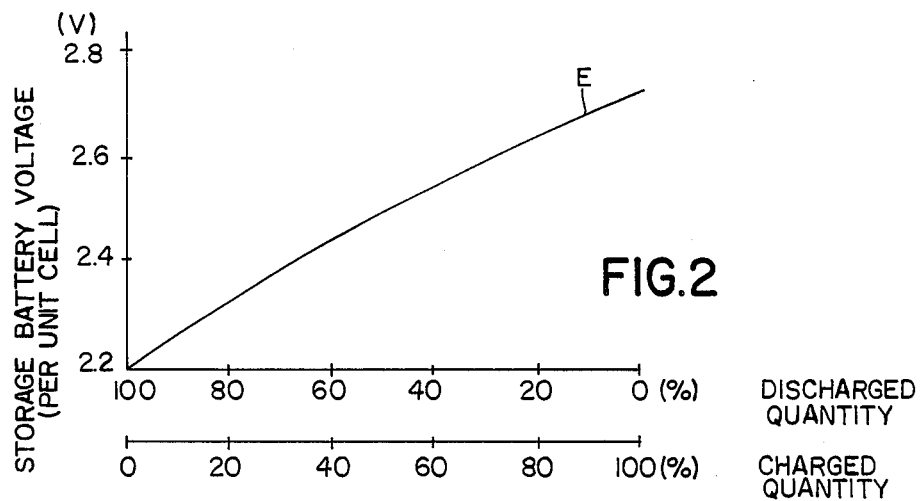
FIG. 2 is a charging control pattern diagram thereof.
Figure 3:
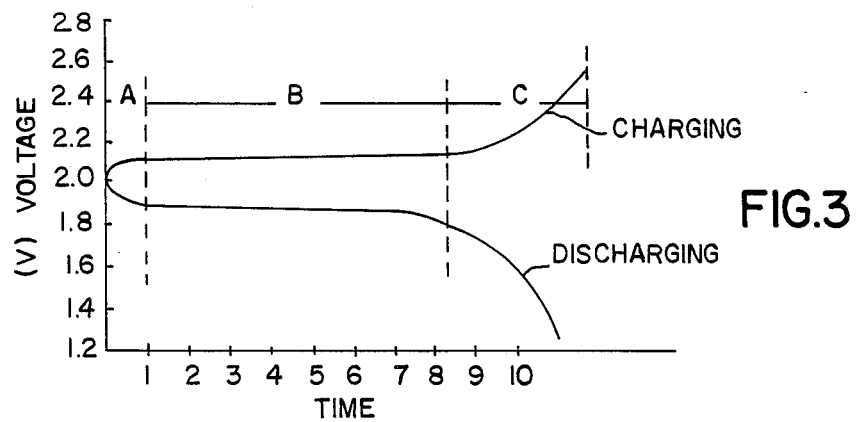
FIG. 3 is a charging and discharging characteristic diagram of a storage battery.
Figure 4:
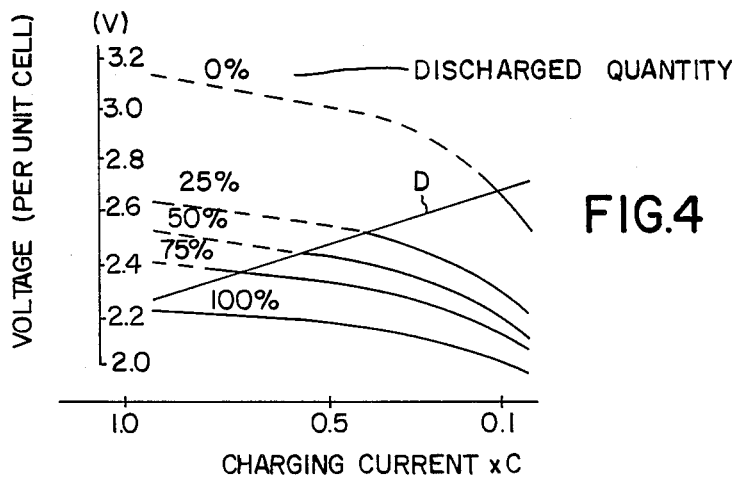
FIG. 4 is a charging current-voltage characteristic diagram of a storage battery.

For the above-mentioned fuel cell generating system, a control system is constructed by output control means of the above-mentioned fuel cell, a current detector 11 of the storage battery 6 shown with a symbol 11 including an output current control means, an ampere hour meter 12 for calculating charging and discharging currents of the storage battery detected by said current detector 11, a voltage detector 13 of the storage battery and a controller 15 which outputs a control command signal $I_{FC}$ to the auxiliary controller 10 and the DC—DC convertor 4 according to the result of comparison of signals from the ampere hour meter 12 and the voltage detector 13 and a charged quantity target value (a value more than the remaining capacity at 80%) of the storage battery stored in a memory 14 with a set value of the allowable charging voltage given with a control pattern shown in FIG. 2. A reference numeral 16 denotes a controller of the DC—DC convertor 4, 17 denotes an output current detector of the fuel cell 3 for detecting the current on the input side of the DC—DC convertor 4 and 18 denotes a comparator for comparing the detected signal of said current detector 17 with the command signal $I_{FC}$ from the controller 15.

Under such an operating condition that the fuel cell generating system is operated and power is fed to the load 5, the detected values of charged and discharged quantities and the voltage of the storage battery 6 are input to the controller 15 through the current detector 11, the ampere hour meter 12 and the voltage detector 13. The controller computes the residual capacity of the storage battery 6 and also compares the charged target value (a value more than the remaining capacity at 80%) of the storage battery stored in the memory 14 with the charging voltage value set corresponding to the residual capacity of the storage battery shown with the control pattern of the allowable charging boundary line E in FIG. 2, and the command signal $I_{FC}$ of the fuel cell output is output from the controller 15 based on the results of this comparison. This command signal is given on the one side to the auxiliary controller 10, and in the auxiliary controller 10, the raw material transfer pump 7, the combustion air blower 8 and the reaction blower 9 are controlled in accordance with the command signal $I_{FC}$, thereby to control the output of the fuel cell 3. At the same time, said command signal $I_{FC}$ is compared with the output signal from the fuel cell current detector 17 in the comparator 18, the DC—DC convertor 4 is controlled through the controller 16 with the result of comparison as the control signal and the output current thereof is varied so as to vary the output current of the fuel cell fed to the side of the load 5 and the storage battery 6 corresponding to the command signal $I_{FC}$.

Thus an operating state in which electricity is discharged to replenish power to the load 5 from the storage battery 6 corresponding to an increase of load is produced. As a result, when the residual capacity is lowered below the charging target value, the voltage of the storage battery 6 also falls into the range of the allowable charging voltage. Accordingly, the controller 15 outputs the command signal $I_{FC}$ so as to increase the output current of the DC—DC convertor 4 under such a condition that the set value of the allowable charging voltage corresponding to the allowable charging boundary line E in the control pattern shown in FIG. 2 is not exceeded. The same command signal $I_{FC}$ is applied to the auxiliary controller 10 before the current of the DC—DC convertor is increased so that the output of the fuel cell is increased. With this, the output currents of the DC—DC converter is increased with a delay in time following the output of the fuel cell. This controlled state is continued until the charged quantity of the storage battery 6 reaches the target value (a certain value more than the remaining capacity at 80%), and during this charging process, charging for recovery is performed while having the command signal $I_{FC}$ which is output from the controller 15, vary momentarily so that the allowable charging voltage set value changes along the allowable charging boundary line E given by the control pattern in FIG. 2 with the increase in the charged quantity of the storage battery 6. This control operation is performed by a control system such as PID control or 2-position control as previously described. When the charged quantity of the storage battery 5 is recovered to the target value, the controller 15 lowers the output of the fuel cell to the original operating state. In the case of no external load, such as at the time of interruption of operation of a forklift, the fuel cell is controlled to stop after the storage battery is charged.

As described above, according to the present invention, there is provided a control unit which displays excellent results for a fuel cell generating system particularly one used for a power supply with sharp load variation, such as a fork lift, in such a manner that it is possible to complete charging of the storage battery in a short time under charging conditions that cause no deterioration of performance of the storage battery, thus always holding the storage battery at a high charged quantity enabling it to cope with a heavy load without shortening the life of the storage battery while also maintaining stable power to the load.

I claim:

1. In a hybrid electric power generating system including a fuel cell and a storage battery connected to the output of said fuel cell as backup for the fuel cell, a control system comprising:
    output control means for controlling the output of said fuel cell;
    output current control means for controlling the current drawn from said fuel cell;
    voltage detecting means for detecting the voltage of said storage battery;
    means including first current detector means for detecting the current flowing to and from said battery for producing an output signal representing remaining storage capacity of said storage battery; and
    first controller means including first comparing means for comparing the detected values of the voltage of and the remaining storage capacity of said battery with set values of allowable charging and discharging voltages for the battery and the target value of always to be maintained remaining storage capacity and producing a control command signal, and means for applying said control command signal to said output control means and to said output current control means.

2. A system according to claim 1, wherein said output current control means comprises:
    DC/DC convertor means connected between the output of said fuel cell and said battery;
    a second current detector for detecting the input current to said DC/DC convertor;
    second comparing means for comparing said detected input current with said control command signal and producing a control signal; and
    second controller means for controlling said DC/DC converter responsively to said control signal for causing the current delivered thereby to vary in amplitude in correspondence with said control command signal.

3. A system according to claim 1 or claim 2, wherein said first controller further comprises:
    an ampere-hour meter connected to the output of said first current detector means for producing an output signal indicative of the remaining storage capacity of said storage battery; and
    wherein said first comparing means includes means for comparing the output signal from said ampere-hour meter with said target value of remaining storage capacity and means for comparing the voltage of said storage battery with said set values of allowable charging and discharging voltages.

4. In a hybrid electric power generating system including a fuel cell and a storage battery connected to the output of the fuel cell as backup for the fuel cell, a control unit comprising:
    output control means for controlling the output of said fuel cell;
    output current control means for controlling the current drawn from said fuel cell;
    voltage detecting means for detecting the voltage across said storage battery;
    means including first current detecting means for detecting the current flowing to and from said storage battery for producing an output signal representative of the value of the remaining charge capacity of said battery; and
    first controller means including means for respectively comparing the detected values of battery voltage and remaining charge capacity of said battery with set values of allowable charging and discharging voltages and an always to be maintained target value of remaining charge capacity, which values are predetermined based on charging characteristics of said storage battery, and producing a command control signal for controlling said output control means and said output current control means responsively to the remaining charge capacity of said battery being lowered to a value below said target value to increase the output of said fuel cell while maintaining the charging voltage below said allowable value thereby to charge the battery for recovery to said target value.

5. A system according to claim 4, wherein said output current control means comprises DC/DC convertor means connected to the output of said fuel cell, second current detecting means for detecting the input current to said DC/DC convertor; means for comparing said detected input current with said command control signal and producing a first control signal, and second controller means coupled to said DC/DC converter for controlling the output current thereof responsively to said first control signal and causing the amplitude of said output current to vary in correspondence with said command control signal.

6. A system according to claim 5, wherein said means for producing the output signal representative of remaining charge capacity further includes an ampere-hour meter connected to said first current detecting means.

7. A system according to claim 6, wherein said first controller means includes memory means for storing said predetermined values of allowable charging and discharging voltages and said target value of remaining charge capacity.

8. In a hybrid power generating system adapted to deliver electric power to a load and including a fuel cell and a storage battery connected to the output side of said fuel cell as a backup power supply, a control system for said fuel cell comprising:

auxiliary controller means for controlling the output of said fuel cell generating means responsively to a control command signal;

DC/DC converter means having an input coupled to the output of said fuel cell and an output connected to said storage battery;

first current detector means for producing a first detected current signal representative of the amplitude of the input current to said DC/DC converter means;

second current detector means for producing a second detected current signal representative of the amplitude of the current flowing to or from said storage battery;

first voltage detector means for producing a detected voltage signal representative of the amplitude of the voltage of said storage battery;

an ampere-hour meter connected to receive said second detected current signal for producing an output signal representative of the remaining storage capacity of said storage battery;

first comparing means for comparing said detected voltage signal with set values of allowable charging voltage for charging and discharging states of said battery, and for comparing said output signal representing remaining storage capacity with an always to be maintained target value of remaining storage capacity, for producing said control command signal;

means for coupling said control command signal to said auxiliary controller; and means for producing and coupling to said DC/DC converter means a control signal which is proportional to said control command signal for controlling the amplitude of the current delivered to said storage battery and to said load.

9. A system according to claim 8, wherein said last-mentioned means comprises:

second comparing means for comparing said first detected current signal with said control command signal and producing said control signal; and controller means for controlling said DC/DC converter means responsively to said control signal for causing the current delivered to said storage battery to vary in amplitude in correspondence with said control command signal.

* * * * *